United States Patent
Maher et al.

(10) Patent No.: US 9,760,772 B2
(45) Date of Patent: Sep. 12, 2017

(54) EYE IMAGE STIMULI FOR EYEGAZE CALIBRATION PROCEDURES

(71) Applicant: LC Technologies, Inc., Fairfax, VA (US)

(72) Inventors: William Maher, North Massapequa, NY (US); Dixon Cleveland, Annandale, VA (US)

(73) Assignee: LC Technologies, Inc., Fairfax, VA (US)

( * ) Notice: Subject to any disclaimer, the term of this patent is extended or adjusted under 35 U.S.C. 154(b) by 342 days.

(21) Appl. No.: 14/663,771

(22) Filed: Mar. 20, 2015

(65) Prior Publication Data
US 2015/0269729 A1    Sep. 24, 2015

Related U.S. Application Data

(60) Provisional application No. 61/955,877, filed on Mar. 20, 2014.

(51) Int. Cl.
*G06K 9/00*    (2006.01)
*G06T 7/73*    (2017.01)

(52) U.S. Cl.
CPC ............ *G06K 9/00604* (2013.01); *G06T 7/73* (2017.01); *G06T 2207/10016* (2013.01)

(58) Field of Classification Search
CPC .............................. G06K 9/00604; G06T 7/73
USPC ............................................................ 348/78
See application file for complete search history.

(56) References Cited

U.S. PATENT DOCUMENTS 7,538,744 B1 *   5/2009   Liu .................. G06F 3/013
                                                    345/7

* cited by examiner

*Primary Examiner* — Jeffery Williams
(74) *Attorney, Agent, or Firm* — John R. Kasha; Kelly L. Kasha; Kasha Law LLC

(57) ABSTRACT

A system and method are disclosed for using a camera image of a user's eye as a visual stimulus for the calibration point in an eyetracking calibration system. A camera image of a user's eye is generated on a user display using an eyetracker. The camera image of the user's eye is used as a visual stimulus of a calibration point. In an embodiment, the center of the pupil of the camera image of the user's eye represents the coordinates of the calibration point on the user display. In another embodiment, the center of the corneal reflection of the camera image of the user's eye represents the coordinates of the calibration point on the user display.

12 Claims, 6 Drawing Sheets

EYE IMAGE STIMULI FOR EYEGAZE CALIBRATION PROCEDURES

CROSS-REFERENCE TO RELATED APPLICATION

This application claims the benefit of U.S. Provisional Patent Application No. 61/955,877, filed Mar. 20, 2014, the content of which is incorporated by reference herein in its entirety.

INTRODUCTION

In order to obtain accurate measurements of an eye's orientation and/or of its gazepoint in space, a calibration process is an important part of using many eyetracking systems. During the calibration process, a user is typically asked to look at a specific point or set of points in space, such as a dot or visual stimulus on a computer screen. For some users, such as children or people with certain disabilities, fixating on a calibration dot can be difficult, tedious or visually unattractive, or the user may just not be inclined to look at the calibration stimulus. As a result, new methods of attracting and maintaining a user's attention during the calibration process are needed.

BRIEF DESCRIPTION OF THE DRAWINGS

The skilled artisan will understand that the drawings, described below, are for illustration purposes only. The drawings are not intended to limit the scope of the present teachings in any way.

Figure 1:
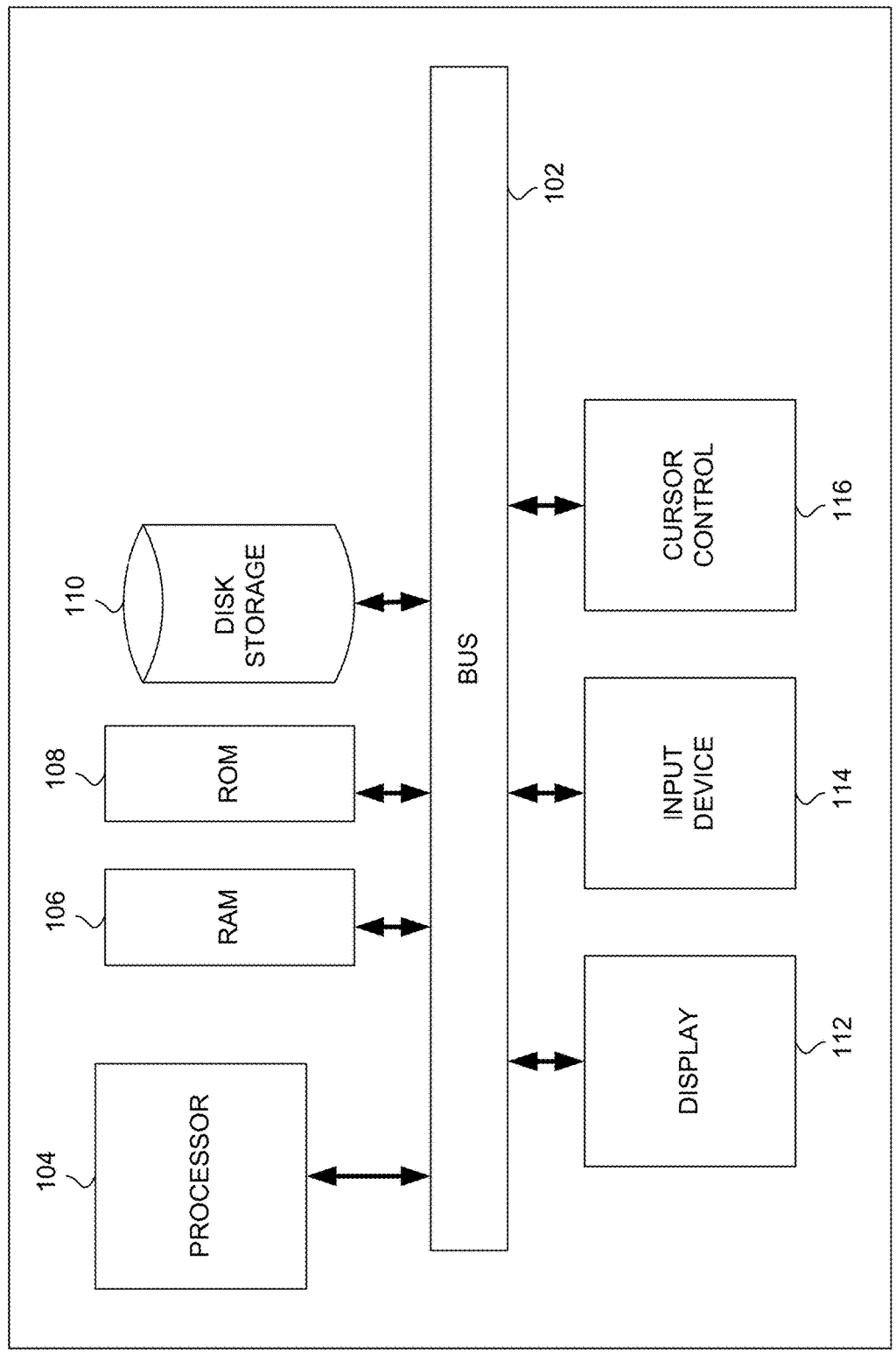
FIG. 1 is a block diagram that illustrates a computer system, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Eyetracker

In general, an eyetracker or eye gaze tracker is a device that is used to determine where an eye is looking. Modern eyetrackers, sometimes referred to as video eyetrackers, are camera-based devices that observe a person's eyes and predict the point in space where the person is looking. This point in space is referred to as the gazepoint, for example. The line connecting the fovea of the eye, the center of the eye pupil, and the gazepoint is referred to as the gaze line, for example.

Figure 2:
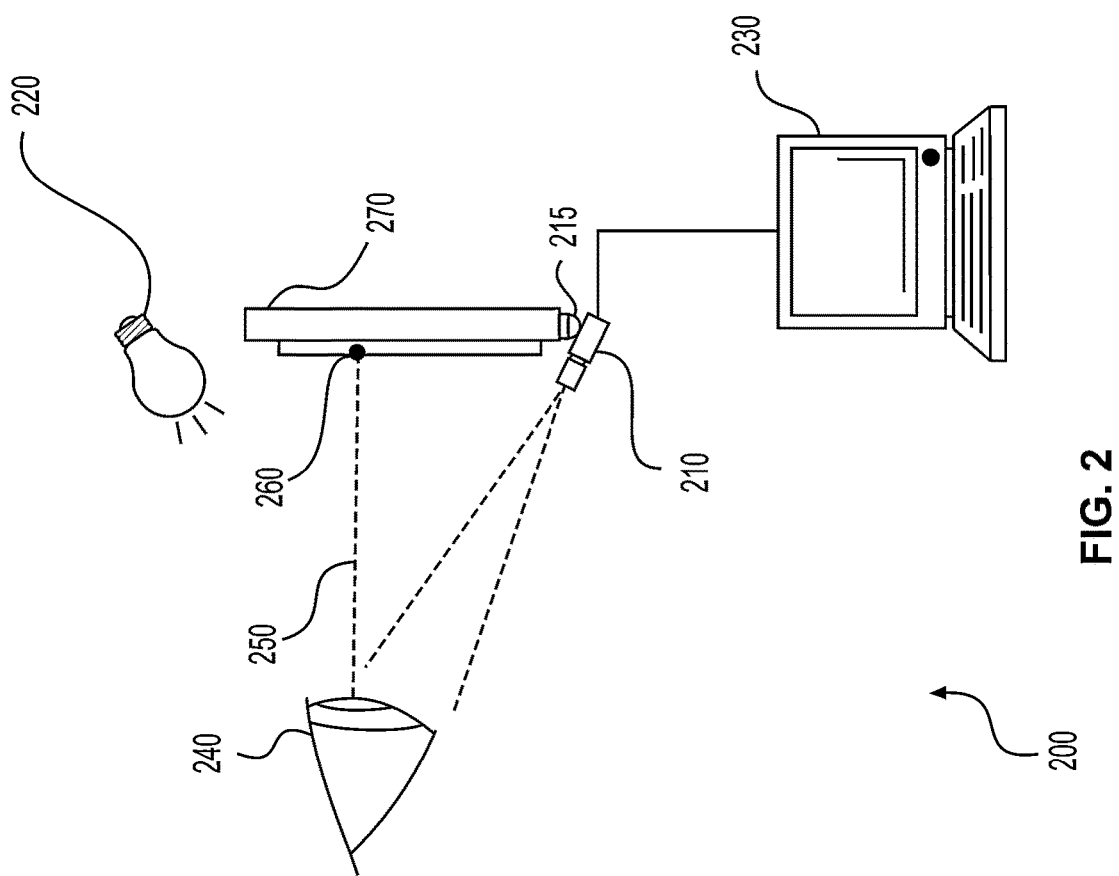
FIG. 2 is a schematic diagram showing an eyetracker, in accordance with various embodiments.

FIG. 2 is a schematic diagram showing an eyetracker 200, in accordance with various embodiments. Eyetracker 200 includes image detector or camera 210, light source 220, and processor 230. Light source 220 illuminates eye 240, and camera 210 images eye 240. Processor 230 receives the image from camera 210 and determines from the image a) the camera's focus condition of the eye and b) the orientation and position of eye 240 in space. Based on the position and focus condition of the eye within the camera image, the processor is able to compute the 3-dimensional location and orientation of actual eye 240 within the camera body frame of reference. From the eye's 3-dimensional location and orientation in space, the processor is able to compute the eye's gaze line 250 and gazepoint 260 in space.

Eyetracker 200 can include additional elements. For example, eyetracker 200 can include one or more additional cameras (not shown) or one or more additional optical devices (not shown) to determine the range from camera 210 to eye 240. Eyetracker 200 can also include display 270 to determine the gazepoint in an image displayed by processor 230 on display 270. In addition, eyetracker 200 can include gimbal 215 to move camera 210 in response to movements of eye 240. Gimbal 215 allows eyetracker 200 to follow eye 240. As a result, with gimbal 215 eyetracker 200 can also be called an eyefollower.

In FIG. 2, image detector or camera 210 and light source 220 are shown as separate components. In various embodiments, image detector or camera 210 can include light source 220.

Eyetracker Calibration Methods

For a video eyetracker to reliably predict a person's gaze within an angle of less than about one or two degrees, it is generally necessary to perform an eye calibration procedure that accounts for normal variations between different geometric, anatomical parameters of different eyes. For example, the location of the foveola on the retina and shape of the cornea exhibit normal variations from one eye to the next. The location of the foveola on the eye's retina with respect to the eye's optic axis is commonly expressed in the optometry field as the angle Kappa, with the horizontal component begin $K_h$ and the vertical component being $K_v$. The curvature shape of the cornea, from which the corneal reflection is received, is commonly expressed in terms of a nominal radius of curvature $r_c$, astigmatism $a_c$, angle of astigmatism $\varnothing_c$, and a flattening coefficient $f_c$ of the cornea toward its edges. It is necessary for the eyetracker to accommodate these eye-to-eye parameter variations if it is to be able to accurately calculate the eye's direction of gaze from measurements of the pupil and corneal reflection from the eyetracker's camera images of the eye.

The eyetracker's geometric information representing the anatomical properties of an individual eye is typically called the "eye calibration data," and the eyetracker's procedure for determining this eye calibration data is generally called the "eye calibration process," or just the "calibration."

From the user perspective, the eyetracker calibration procedure typically involves the person visually following a small visual stimulus, often called a "calibration point," a "calibration dot" or a "calibration icon," as it moves around on a display such as a computer screen. The calibration point may move from discretely from one fixed location to another or it may move more continuously with prescribed velocities. As the calibration procedure moves the calibration point from one place to another, e.g., from one coordinate $(x_g, y_g)$ on the display surface to another, a) the eyetracker captures the corresponding eye images, b) measures the location $(i_{pc}, j_{pc})$ of the pupil center and the location $(i_{cr}, j_{cr})$ of the corneal reflection of the eye within the camera images (where, for example, i and j are pixel coordinates within the camera image), and c) stores these eye image measurements $(i_{pc}, j_{pc}; i_{cr}, j_{cr})$ with their associated gazepoint locations $(x_g, y_g)$ on the display surface.

Finally, the calibration procedure generates a mathematical mapping function or model M that optimally converts the measured image locations ($i_{pc}$, $j_{pc}$; $i_{cr}$, $j_{cr}$) to the associated gazepoint coordinates ($x_g$, $y_g$) on the display surface:

$$(x_g, y_g) = M(i_{pc}, j_{pc}, i_{cr}, j_{cr}; K_h, K_v, r_c, a_c, \emptyset_c, f_c)$$

To predict the gazepoint accurately, however, note that the mapping function M is a function not only of the measured image parameters (e.g., $i_{pc}$, $j_{pc}$, $i_{cr}$, $j_{cr}$), but is also a function of the anatomical eye parameters (e.g., $K_h$, $K_v$, $r_c$, $a_c$, $\emptyset_c$, $f_c$). The purpose of the eyegaze calibration function is to optimize the gazepoint mapping function M with respect to the specific anatomical parameters of the individual eye. The calibration procedure may use a wide variety of mathematical modeling methods well known in the mathematical modeling field, to generate the mapping function M, including parameter estimation techniques, linear and nonlinear regression models, and neural learning network models.

In other words, during the calibration procedure an image is placed at calibration points ($x_g$, $y_g$) and the eye image measurements ($i_{pc}$, $j_{pc}$; $i_{cr}$, $j_{cr}$) are calculated from the image for each calibration point. These values are then used to estimate the anatomical eye parameters (e.g., $K_h$, $K_v$, $r_c$, $a_c$, $\emptyset_c$, $f_c$) for the eye. The mapping function or model M with the estimated anatomical eye parameters is then used is all subsequent gazepoint calculations for the eye.

Given an accurate set of eye calibration data, the eyetracker's gazepoint calculation algorithms may then accurately map the outputs from the eyetracker sensor (e.g., the locations of the pupil center and corneal reflection within a camera image) to the predicted eye orientation and/or gazepoint location.

It should be noted that the sets of gazepoint coordinates, eye image variables, and eye anatomy parameters used in the above descriptions are exemplary only and in practice may contain different particular variables for different eyetracker implementations. For example: the gazepoint coordinates may include 1, 2 or 3 dimensions; the measured image parameters may include pupil diameter, pupil shape, and/or camera focus-condition information; and the eye anatomy parameters may include other shape parameters of the corneal surface, such as astigmatism and/or flattening of the corneal surface out toward the edges. Neither the specific variables and parameters used in the particular eyetracker calibration procedures, nor the mathematical modeling methods used to generate mapping model M, limit the scope of the following calibration-stimulus invention.

Use of Eye Image Stimuli for Eyegaze Calibration

As can be seen from the above description of the calibration's mathematical modeling function, it is important that the person look directly at the calibration points when the calibration process is collecting eye-image data. When the eye calibration procedure generates an optimal mapping model M, it intrinsically assumes that the user is actually looking at the point on the display where the calibration point is displayed. Thus, in general, errors may be introduced into the model M in approximate proportion to any spatial offsets between the user's true gazepoint and the location of the displayed calibration-point stimulus. Stated another way, the closer the user actually looks at the calibration points, the better the mapping model M will predict his true gazepoint after the calibration process is done, and the better the eyetracker's gazepoint accuracy will be. A key objective of this invention is to present calibration-point stimuli that encourages a person a) to look directly at the stimulus, and b) to maintain his gaze fixated directly on that stimulus as the calibration point moves around the display space.

The human brain is naturally well adapted to recognize eyes, and it is naturally curious to pay close attention to eye activity. Displaying a live video image of a person's own eye typically attracts and maintains his very close attention. Since maintaining visual attention is exactly what is desired during an eyetracker calibration procedure, the key concept and embodiment of this invention is for the calibration procedure to use the eyetracker's own real time video image of a user's eye as the visual stimulus for the calibration point. In various embodiments, as the eye image moves around the screen, the calibration point moves with it, allowing the calibration procedure to collect and model accurate gazepoint information throughout the desired display area, while naturally maintaining the user's attention.

Figure 3:
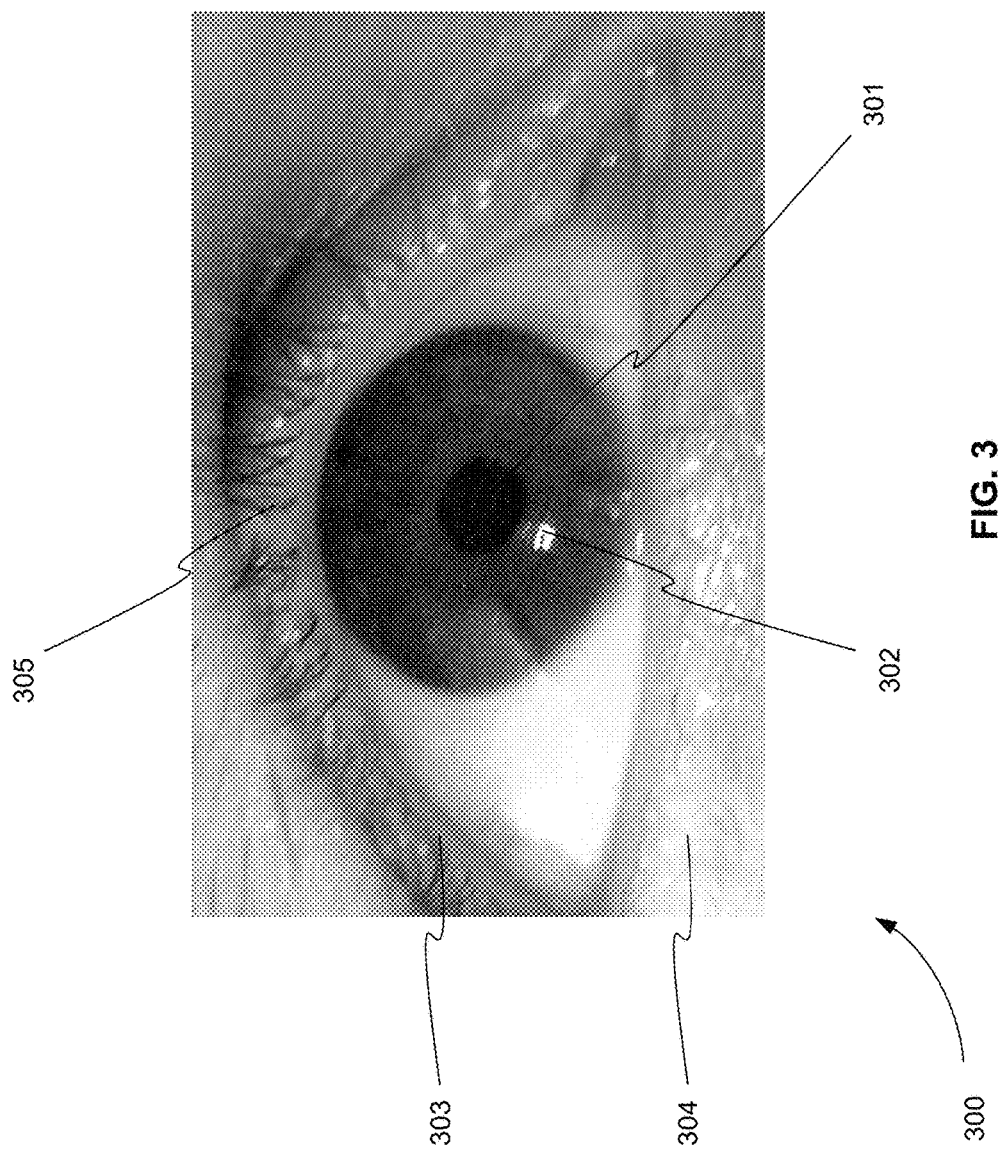
FIG. 3 is an exemplary eyetracker camera image of an eye, in accordance with various embodiments.

FIG. 3 is an exemplary eyetracker camera image 300 of an eye, in accordance with various embodiments. Image 300 includes pupil 301, corneal reflection 302, eyelids 303 and 304, and eyelashes 305. As the eye looks right/left/up/down, pupil 301 moves around within the eyelid opening (between lids 303 and 304), and pupil 301 moves around with respect to corneal reflection 302.

Figure 4:
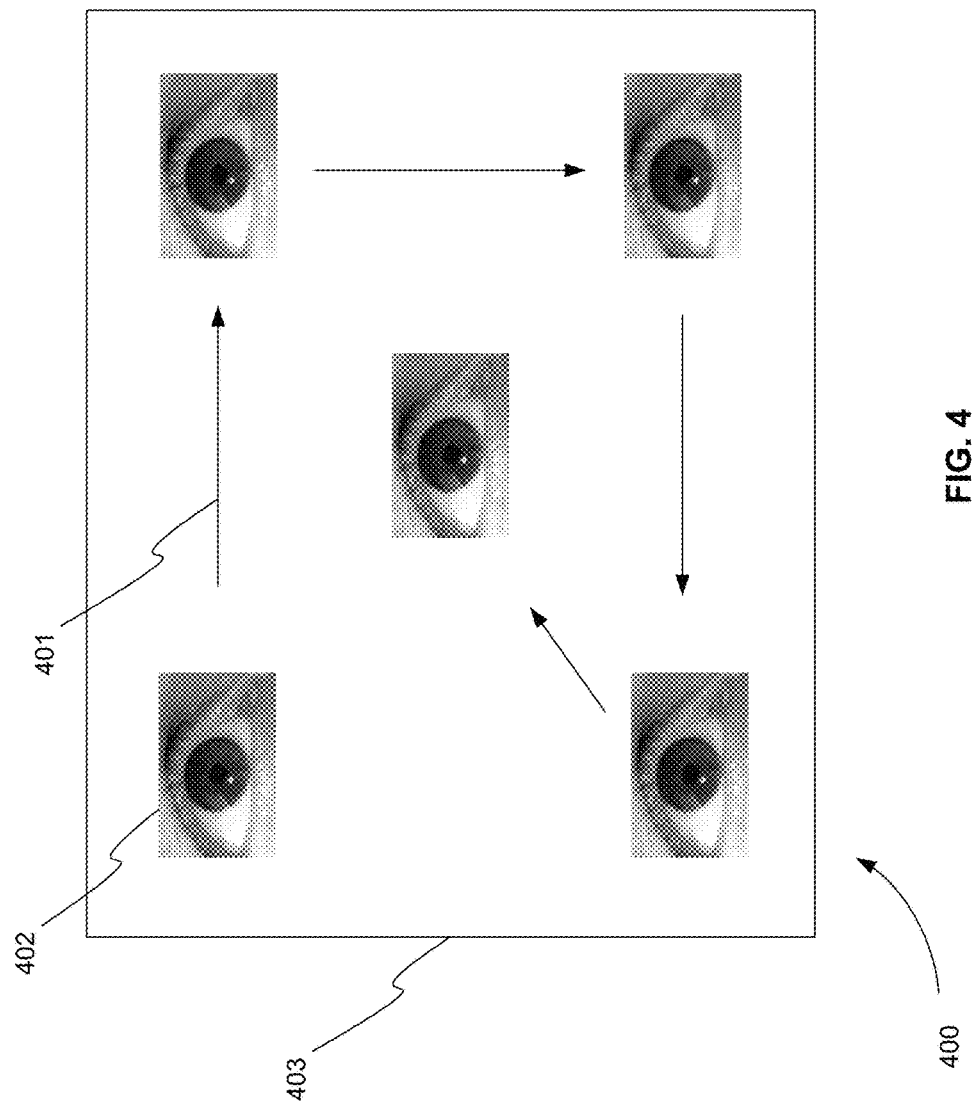
FIG. 4 is an exemplary diagram showing a sequence of five positions of an eye-image stimulus on a display as the eye-image stimulus progresses through an eyegaze calibration procedure, in accordance with various embodiments.

FIG. 4 is an exemplary diagram 400 showing a sequence of five positions of an eye-image stimulus 402 on a display 403 as the eye-image stimulus 402 progresses through an eyegaze calibration procedure, in accordance with various embodiments. Arrows 201 depict the path of progression through the calibration procedure. Note that in diagram 400 the direction of the eye of eye-image stimulus 402 does not change among the five different positions. In an actual calibration procedure, however, the direction of the eye of eye-image stimulus 402 does change because the eye is looking at different positions during the calibration procedure.

FIG. 4 illustrates a common 5-point sequence of calibration-point locations on a typical computer screen. FIG. 4 also illustrates the use of an eye image as the calibration point's visual stimulus. One skilled in the art will appreciate that the number of different positions of the eye image used, the particular positions of the eye image on the display, and the sequence of the different positions in FIG. 4 are for illustration purposes only, and do not limit the scope of this invention.

Children are particularly attracted to their eye image, and often continue to pay attention to it even when they might lose interest in other animated displays designed especially to attract their attention. The real-time image of their own eye provides the fascination of a mirror, but has the added advantage that the person can see the left/right/up/down angular orientation of his eye change as the location of the eye image changes on the display.

Another advantage of using the video eye image as the calibration stimulus is that the eye image provides a strong suggestion to the user that the eyetracker is actively watching his eye, and that the system exhibits an interactive, enabling behavior of actively responding to his eye activity. This is an important, although often unconscious, concept for the user to perceive and learn: the eyetracker pays attention to your eye activity, and it can do things for you if you visually interact with it by moving your eyes.

Yet another advantage of using the video eye image as the calibration stimulus is that the image provides feedback to the user and/or his care giver whether the camera is pointed at and focused on the eye, or, in the vernacular, whether the eyetracker is making good "eye contact" with the user.

In one embodiment of this invention, the eyetracker's camera image of a user's eye is used as the calibration point's visual stimulus in the eyetracker calibration procedure.

As discussed above, to obtain an optimal calibration, it is desired that the user look as precisely as possible at the specific coordinate on the display surface that is designated as the screen calibration point. Since even a small image of an eye spans a finite area, it is useful a) to designate a specific point within the area of the visual stimulus image as the "image reference point" and b) to define the coordinate on the display where this image reference point falls as the "display calibration point." Typically, there are two key features of an eye image that attract a person's attention: the pupil and the corneal reflection. Therefore either of these two features, i.e., the center of the pupil or the center of the corneal reflection, provide good candidates for the image reference point. In one embodiment of this invention, the center of the pupil is designated as the image reference point, and its position as displayed on the display represents the coordinate of the calibration point on the user display. In another embodiment of this invention, the center of the corneal reflection is designated as the image reference point, and its position as displayed on the display represents the coordinate of the calibration point on the user display.

To minimize visual distractions outside the calibration point image, and thus to keep the user's true gazepoint as close as possible to the desired screen calibration point, the display background surrounding the calibration-point image is made to be as uniform in brightness, color, texture as possible.

To maximize the user's tendency to fixate on the designated image reference point (such as the pupil center or corneal-reflection center), in various embodiments, the visual stimulus image can be cropped such that the image reference point lies at the center of the overall stimulus image frame.

System for Providing Calibration Points for an Eyetracker

In various embodiments, a system is provided that uses the video image captured by the eyetracker as calibration points for a calibration procedure of the eyetracker. Returning to FIG. 2, the system includes display 270, video camera 210, and processor 230. Display 270 can be any type of computer screen including, but not limited to, a cathode ray tube (CRT) device, light emitting diode (LED) device, or Liquid crystal display (LCD) device.

Video camera 210 is the camera of the eyetracker. Video camera 210 records a video image an eye of a user as the user is viewing the display. For example, video camera 210 provides a continuous stream or sequence of images of the eye called the video image (video feed or live video feed).

Processor 230 can be, but is not limited to, a microprocessor, a micro controller, or a computer such as the system shown in FIG. 1. Processor 230 is a processor of the eyetracker. Processor 230 is in communication with display 270 and video camera 210. During a calibration procedure of the eyetracker, processor 230 displays the video image of the eye at two or more positions on display 270 over time to provide two or more calibration points for the eye.

In various embodiments, processor 230 can further calculate calibration data for a particular eye. For example, processor 230 calculates a gaze point of the eye on the display and one or more eye image measurements from the video image at the two or more positions, producing a plurality of gaze points and eye image measurements. Processor 230 then calculates a mathematical mapping model for the eye from the plurality of gaze points and eye image measurements that is used in subsequent gazepoint calculations for the eye.

In various embodiments, the one or more eye image measurements include the center of the pupil in the video image or the center of the corneal reflection in the video image.

Method for Providing Calibration Points for an Eyetracker

Figure 5:
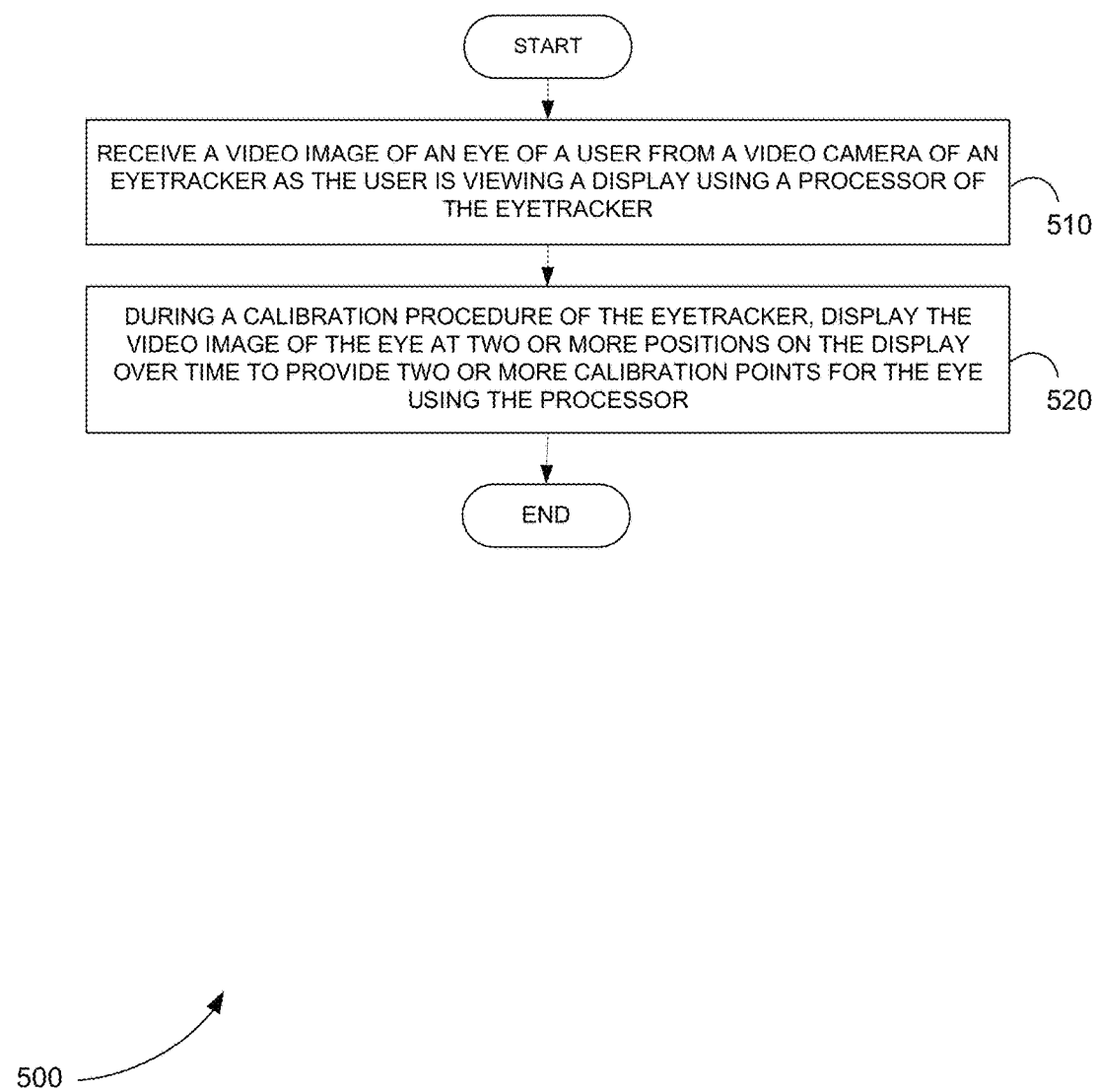
FIG. 5 is a flowchart showing a method for providing calibration points for a calibration procedure of an eyetracker, in accordance with various embodiments.

FIG. 5 is a flowchart showing a method 500 for providing calibration points for a calibration procedure of an eyetracker, in accordance with various embodiments.

In step 510 of method 500, a video image of an eye of a user is received from a video camera of an eyetracker as the user is viewing a display using a processor of the eyetracker.

In step 520, during a calibration procedure of the eyetracker, the video image of the eye is displayed at two or more positions on the display over time to provide two or more calibration points for the eye using the processor.

Computer Program Product for Providing Calibration points for an Eyetracker

In various embodiments, computer program products include a tangible computer-readable storage medium whose contents include a program with instructions being executed on a processor so as to perform a method for providing calibration points for a calibration procedure of an. This method is performed by a system that includes one or more distinct software modules.

Figure 6:
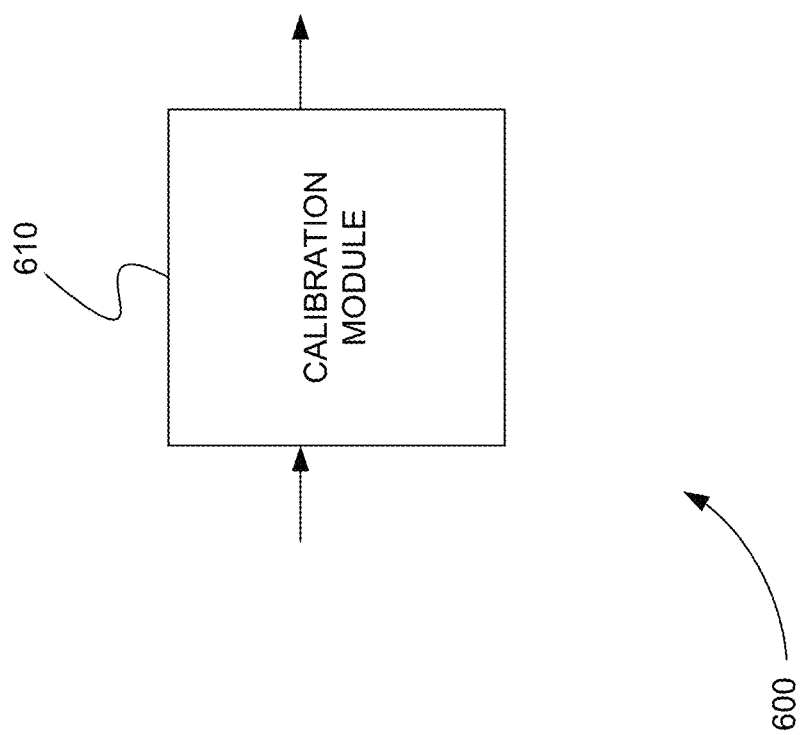
FIG. 6 is a schematic diagram of a system that includes one or more distinct software modules that performs a method for providing calibration points for a calibration procedure of an eyetracker, in accordance with various embodiments.

FIG. 6 is a schematic diagram of a system 600 that includes one or more distinct software modules that performs a method for providing calibration points for a calibration procedure of an eyetracker, in accordance with various embodiments. System 600 includes calibration module 610.

Calibration module 610 receives a video image of an eye of a user from a video camera of an eyetracker as the user is viewing a display. During a calibration procedure of the eyetracker, calibration module 610 displays the video image of the eye at two or more positions on the display over time to provide two or more calibration points for the eye.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for providing calibration points for a calibration procedure of an eyetracker, comprising:
   a display;
   a video camera of the eyetracker that records a real time video image an eye of a user as the user is viewing the display; and a processor of the eyetracker in communication with the display and the video camera that during a calibration procedure of the eyetracker displays the real time video image of the eye at two or more positions on the display over time to provide two or more calibration points for the eye.

2. The system of claim 1, wherein the processor further calculates one or more eye image measurements from the video image at the two or more positions, producing a plurality of eye image measurements; and calculates a mathematical mapping model for the eye from the plurality of eye image measurements that is used in subsequent gazepoint calculations for the eye.

3. The system of claim 2, wherein the one or more eye image measurements comprise the center of the pupil in the video image.

4. The system of claim 2, wherein the one or more eye image measurements comprise the center of the corneal reflection in the video image.

5. A method for providing calibration points for a calibration procedure of an eyetracker, comprising:

receiving a real time video image of an eye of a user from a video camera of an eyetracker as the user is viewing a display using a processor of the eyetracker; and during a calibration procedure of the eyetracker, displaying the real time video image of the eye at two or more positions on the display over time to provide two or more calibration points for the eye using the processor.

6. The method of claim 5, further comprising calculating one or more eye image measurements from the video image at the two or more positions using the processor, producing a plurality of eye image measurements; and calculating a mathematical mapping model for the eye from the plurality of eye image measurements that is used in subsequent gazepoint calculations for the eye using the processor.

7. The method of claim 6, wherein the one or more eye image measurements comprise the center of the pupil in the video image.

8. The method of claim 6, wherein the one or more eye image measurements comprise the center of the corneal reflection in the video image.

9. A computer program product, comprising a non-transitory and tangible computer-readable storage medium whose contents include a program with instructions being executed on a processor so as to perform a method for providing calibration points for a calibration procedure of an eyetracker, the method comprising:

providing a system, wherein the system comprises one or more distinct software modules, and wherein the distinct software modules comprise a calibration module;

receiving a real time video image of an eye of a user from a video camera of an eyetracker as the user is viewing a display using the calibration module; and during a calibration procedure of the eyetracker, displaying the real time video image of the eye at two or more positions on the display over time to provide two or more calibration points for the eye using the calibration module.

10. The computer program product of claim 9, further comprising calculating one or more eye image measurements from the video image at the two or more positions using the calibration module, producing a plurality of eye image measurements; and calculating a mathematical mapping model for the eye from the plurality of eye image measurements that is used in subsequent gazepoint calculations for the eye using the calibration module.

11. The computer program product of claim 10, wherein the one or more eye image measurements comprise the center of the pupil in the video image.

12. The computer program product of claim 10, wherein the one or more eye image measurements comprise the center of the corneal reflection in the video image.

\* \* \* \* \*